(12) United States Patent
Islam

(10) Patent No.: US 9,536,640 B2
(45) Date of Patent: Jan. 3, 2017

(54) RUGGED FURCATION TUBE

(71) Applicant: CommScope Technologies LLC, Hickory, NC (US)

(72) Inventor: Nahid Islam, Westmont, IL (US)

(73) Assignee: CommScope Technologies LLC, Hickory, NC (US)

( * ) Notice: Subject to any disclaimer, the term of this patent is extended or adjusted under 35 U.S.C. 154(b) by 553 days.

(21) Appl. No.: 13/832,131

(22) Filed: Mar. 15, 2013

(65) Prior Publication Data

US 2014/0140669 A1 May 22, 2014

Related U.S. Application Data

(60) Provisional application No. 61/728,020, filed on Nov. 19, 2012.

(51) Int. Cl.
| | |
|---|---|
| G02B 6/44 | (2006.01) |
| H01B 13/00 | (2006.01) |
| H01B 11/22 | (2006.01) |
| H02G 1/08 | (2006.01) |
| H02G 15/013 | (2006.01) |

(52) U.S. Cl.
CPC ............ *H01B 13/00* (2013.01); *G02B 6/4416* (2013.01); *G02B 6/4471* (2013.01); *H01B 11/22* (2013.01); *G02B 6/4472* (2013.01); *H02G 1/081* (2013.01); *H02G 15/013* (2013.01); *Y10T 29/49117* (2015.01); *Y10T 29/49826* (2015.01)

(58) Field of Classification Search
None
See application file for complete search history.

(56) References Cited

U.S. PATENT DOCUMENTS

| | | | |
|---|---|---|---|
| 4,695,127 A | | 9/1987 | Ohlhaber et al. |
| 5,050,958 A | * | 9/1991 | Smith et al. ................ 385/102 |
| 5,345,526 A | | 9/1994 | Blew |
| 5,408,561 A | * | 4/1995 | McCallum et al. .......... 385/109 |
| 5,418,878 A | | 5/1995 | Sass et al. |
| 5,467,420 A | | 11/1995 | Rohrmann et al. |
| 5,468,913 A | | 11/1995 | Seaman et al. |
| 5,539,851 A | | 7/1996 | Taylor et al. |
| 5,915,055 A | | 6/1999 | Bennett et al. |
| 6,195,487 B1 | * | 2/2001 | Anderson et al. ............ 385/101 |
| 6,326,550 B1 | | 12/2001 | Dyer et al. |

(Continued)

FOREIGN PATENT DOCUMENTS

EP 2163928 3/2010

OTHER PUBLICATIONS

Sung Chul Kang, International Search Report for PCT/US2013/061525, Jan. 22, 2014, Daejeon Metropolitan City, Republic of Korea.

(Continued)

*Primary Examiner* — Sung Pak
(74) *Attorney, Agent, or Firm* — Myers Bigel, P.A.

(57) ABSTRACT

A furcation tube for optical fibers has a polymer inner jacket surrounded by a fiber and strength member layer of fibers and strength rods, which is surrounded by a polymer outer jacket. The inner jacket may surround a plurality of inner tubes. The strength members may be arrayed around the inner jacket generally equidistant from one another. The strength members may be resin pultruded fiber rods and the fiber may be para-aramid fibers.

19 Claims, 7 Drawing Sheets

(56) References Cited

U.S. PATENT DOCUMENTS

| | | |
|---|---|---|
| 6,350,947 B1 * | 2/2002 | Bertini et al. .................. 174/47 |
| 6,738,555 B1 | 5/2004 | Cooke et al. |
| 7,035,511 B1 | 4/2006 | Rhoney et al. |
| 7,257,298 B2 | 8/2007 | Moon et al. |
| 7,738,759 B2 | 6/2010 | Parikh et al. |
| 7,903,925 B2 | 3/2011 | Cooke et al. |
| 7,955,004 B2 | 6/2011 | DiMarco |
| 8,000,572 B2 * | 8/2011 | Varkey .......................... 385/100 |
| 8,155,490 B2 | 4/2012 | de Jong et al. |
| 8,267,596 B2 | 9/2012 | Theuerkorn |
| 2002/0003935 A1 * | 1/2002 | Warden et al. ............... 385/104 |
| 2004/0197066 A1 | 10/2004 | Daoud |
| 2005/0276551 A1 | 12/2005 | Brown et al. |
| 2006/0188210 A1 | 8/2006 | Zimmel |
| 2008/0138026 A1 | 6/2008 | Yow et al. |
| 2008/0247717 A1 | 10/2008 | Patlakh |
| 2008/0289851 A1 * | 11/2008 | Varkey ................. G02B 6/4416 174/115 |
| 2009/0060431 A1 * | 3/2009 | Lu ........................ G02B 6/4475 385/114 |
| 2009/0304338 A1 | 12/2009 | Davidson et al. |
| 2010/0098386 A1 | 4/2010 | Kleeberger |
| 2010/0158457 A1 * | 6/2010 | Drozd et al. .................. 385/113 |
| 2011/0243514 A1 * | 10/2011 | Nav ...................... G02B 6/4459 385/110 |
| 2012/0230636 A1 | 9/2012 | Blockley et al. |
| 2012/0328253 A1 | 12/2012 | Hurley et al. |
| 2013/0163932 A1 * | 6/2013 | Cooke .................. G02B 6/4472 385/76 |
| 2014/0226940 A1 * | 8/2014 | Keller et al. ................. 385/111 |

OTHER PUBLICATIONS

Jon Andreassen, European Search Report for associated application EP13857286, European Patent Office, Berlin Germany.

\* cited by examiner

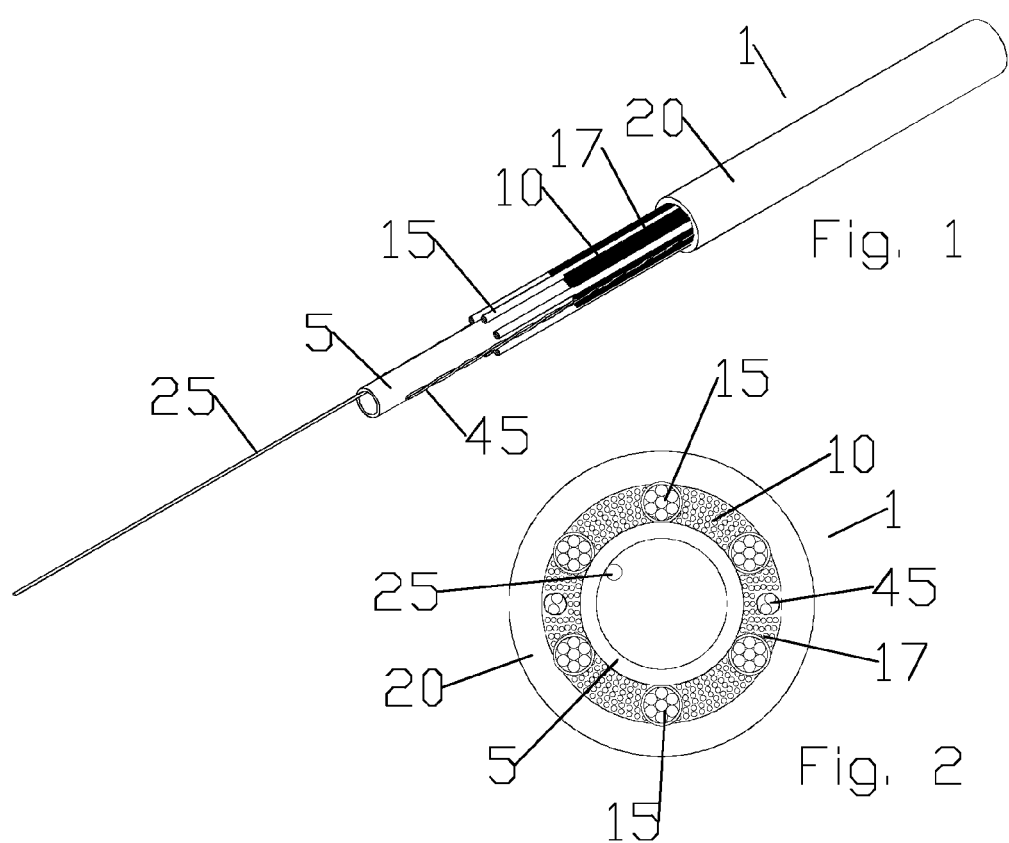

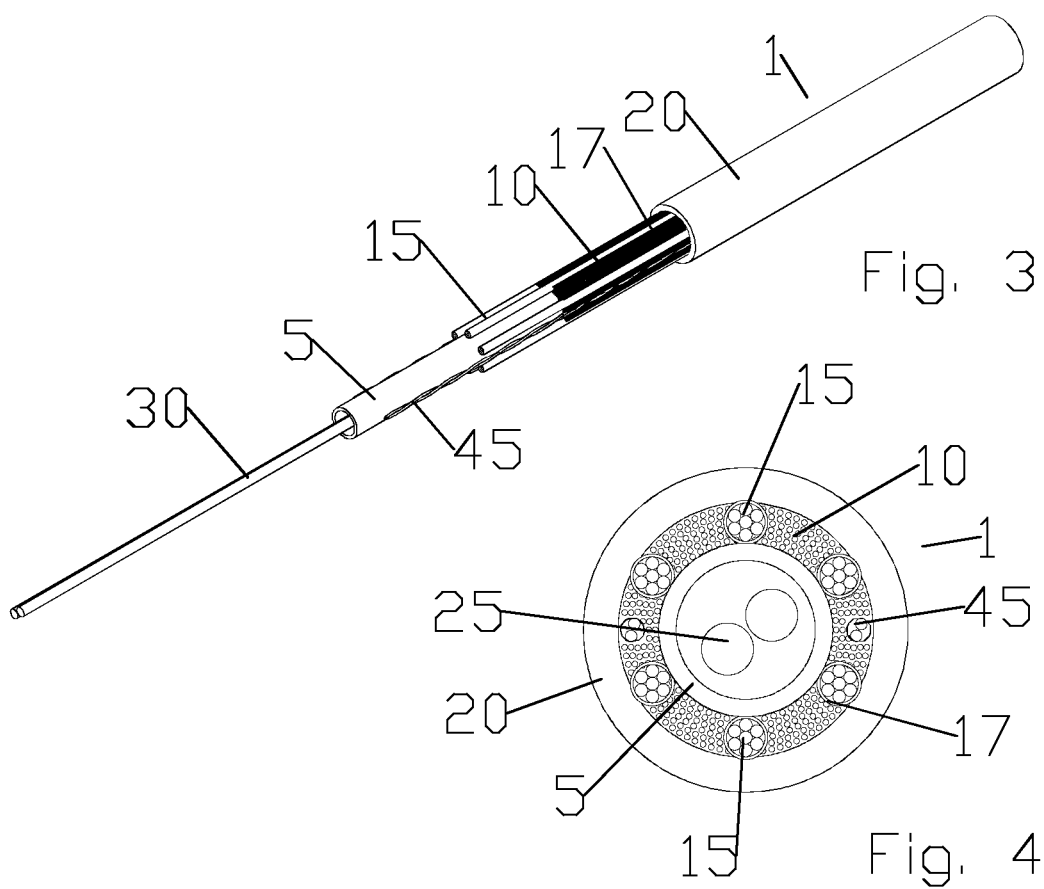

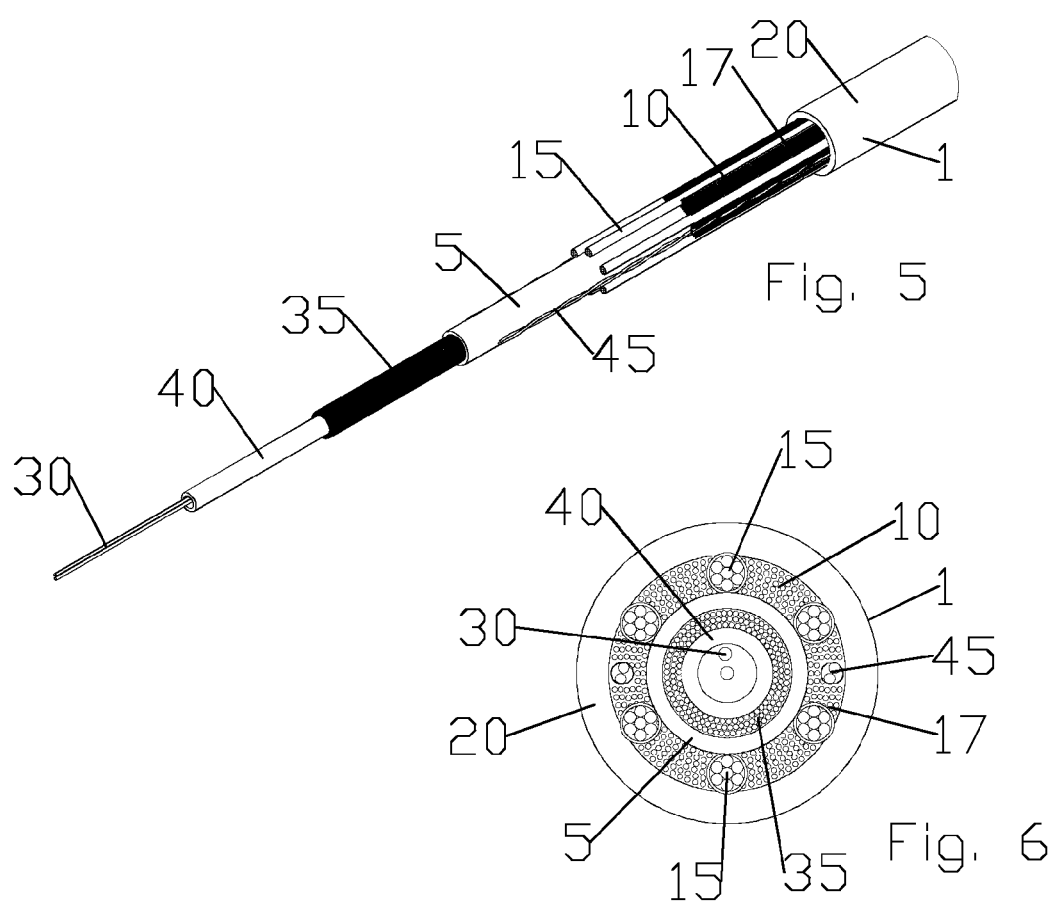

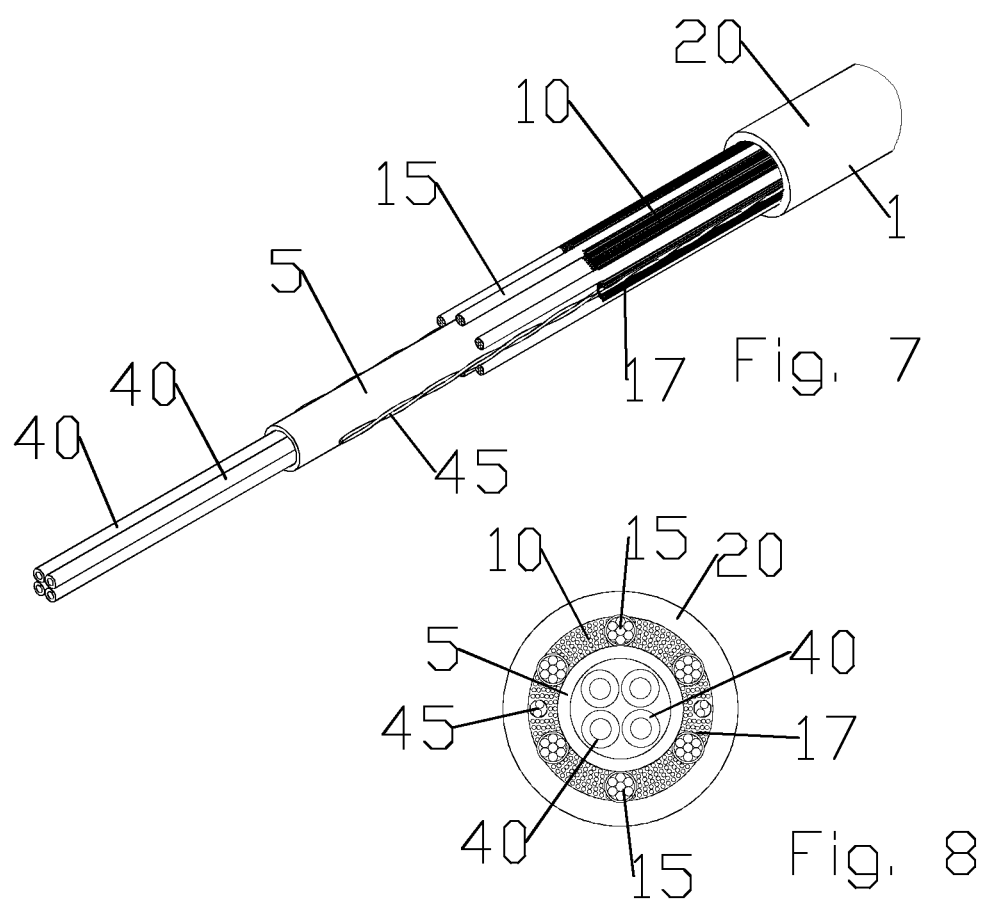

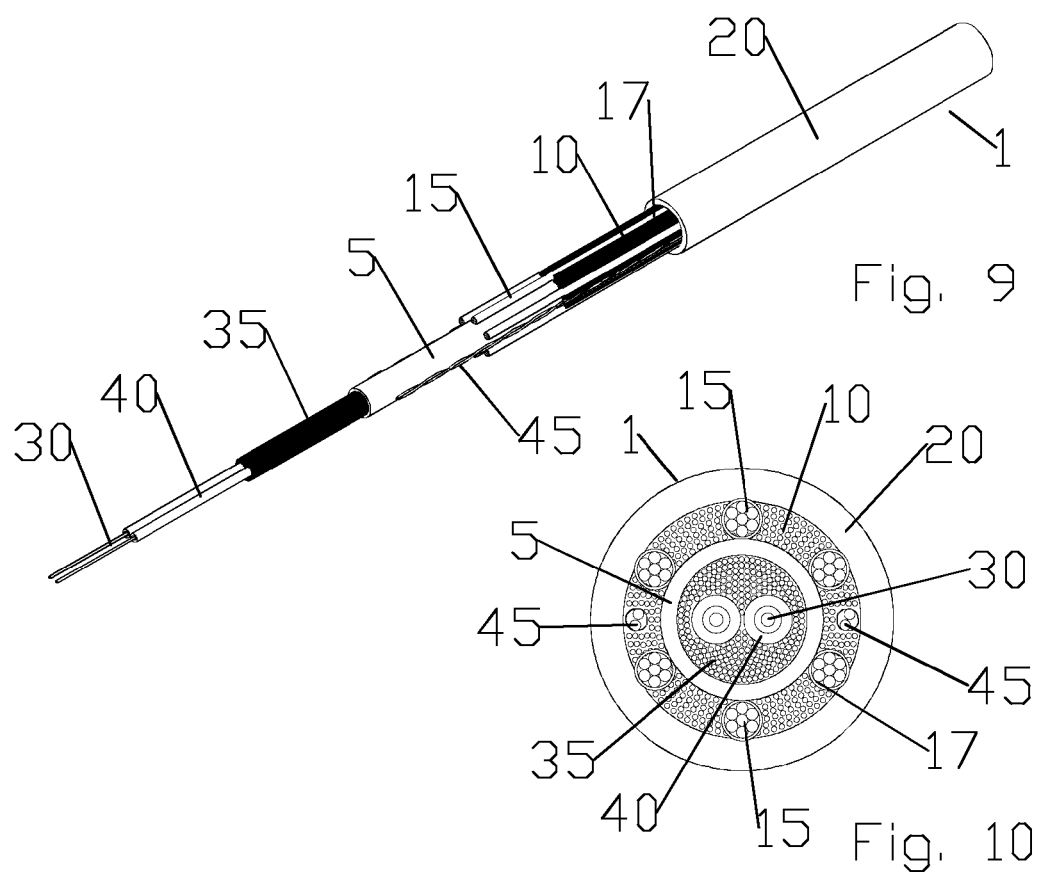

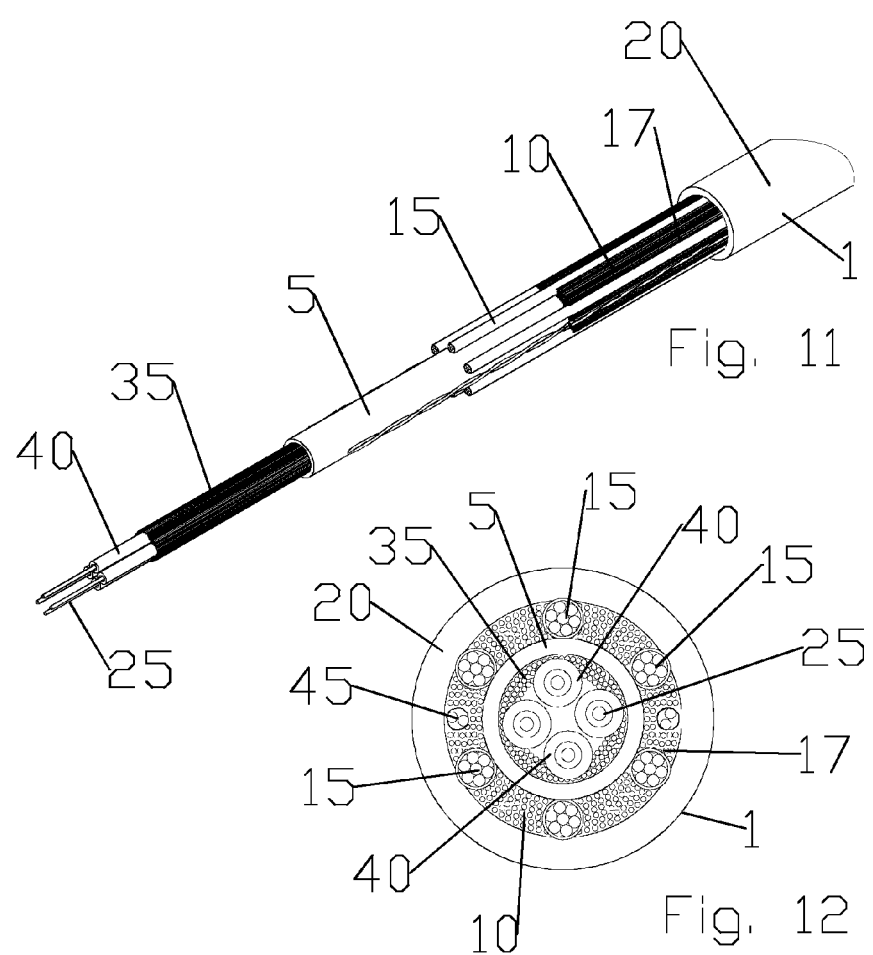

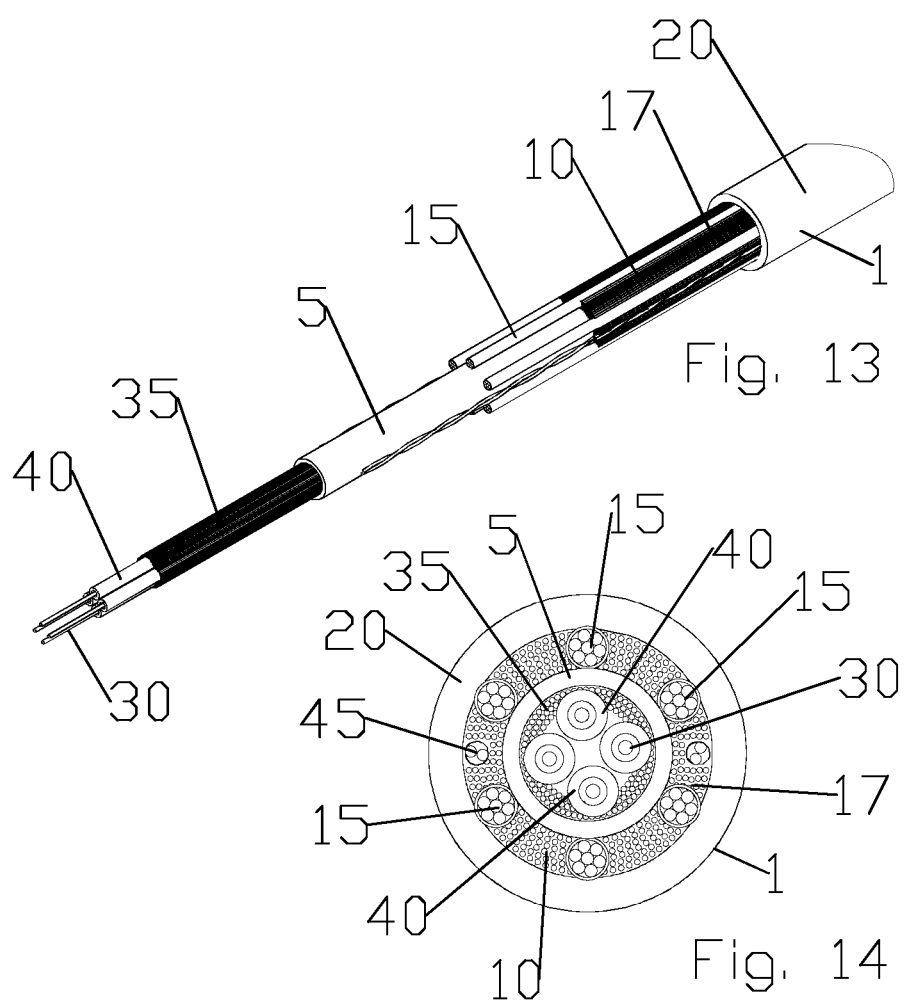

RUGGED FURCATION TUBE

BACKGROUND

Field of the Invention

This invention relates to optical cable assemblies. More particularly, the invention relates to an optical fiber furcation tube with improved strength characteristics and/or ease of use.

Description of Related Art

The wireless communications industry is changing from traditional signal delivery from ground based transceivers delivering/receiving the RF signal to/from the antenna atop the radio tower via bulky/heavy/high material cost metal RF coaxial cable to optical signal delivery to a tower top mounted transceiver known as a remote radio unit (RRU) or remote radio head (RRH) with implementation of fiber to the antenna (FTTA) cabling.

Optical conductors of FTTA cabling may be fragile, requiring great care to properly terminate.

Prior RRU/RRH terminations have employed an overvoltage protection and/or distribution box for terminating each of the optical conductors as individual jumpers. These additional enclosures require field termination of the several conductors atop the radio tower, increasing installation time and labor requirements. Further, each break in the conductors provides another opportunity for signal degradation and/or environmental fouling.

Factory terminated cable assemblies are known. However, these assemblies may apply splices to the conductors, require a relatively large in-line break-out/splice enclosure and/or utilize environmental seals which fail to positively interlock the jumpers therewith, which may increase the potential for cable and/or individual conductor damage to occur.

Furcation tubes may be applied to fibers and or fiber bundles stripped back from the cable end to protect the optical fibers from damage between the cable and the optical fiber termination. Prior optical fiber furcation tubes typically consist of an inner polymer tube surrounded by a para-aramid synthetic fiber sheath, or a para-aramid synthetic fiber sheath alone. Further, it may be labor intensive to prepare the furcation tube for interconnection and/or to thread an optical fiber through a furcation tube.

Therefore, an object of the invention is to provide an optical conductor furcation tube solution that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

FIG. 1 is a schematic isometric view of an exemplary furcation tube with a pull strand.

FIG. 2 is a schematic end view of the furcation tube of FIG. 1.

FIG. 3 is a schematic isometric view of the furcation tube of FIG. 1, with an optical fiber inserted.

FIG. 4 is a schematic end view of the furcation tube of FIG. 3.

FIG. 5 is a schematic isometric view of an alternative furcation tube with an optical fiber inserted.

FIG. 6 is a schematic end view of the furcation tube of FIG. 5.

FIG. 7 is a schematic isometric view of an alternative furcation tube with multiple inner tubes.

FIG. 8 is a schematic end view of the furcation tube of FIG. 7.

FIG. 9 is a schematic isometric view of an alternative furcation tube with multiple inner tubes and a foam layer.

FIG. 10 is a schematic end view of the furcation tube of FIG. 9.

FIG. 11 is a schematic isometric view of an alternative furcation tube with multiple inner tubes, a foam layer and pull strands.

FIG. 12 is a schematic end view of the furcation tube of FIG. 11.

FIG. 13 is a schematic isometric view of the furcaction tube of FIG. 11, with optical fibers inserted.

FIG. 14 is a schematic end view of the furcation tube of FIG. 13.

DETAILED DESCRIPTION

In order to connect conductors and/or fibers of a cable directly to the RRH, optical fiber and electrical conductors, if present, may be separated from the cable as individual jumpers, the jumpers protected with separate furcation tubes. The inventor has recognized that, although available optical furcation tubes may provide protection, compared to a bare optical fiber, damage to optical fibers may still occur if the furcation tube is crushed, kinked or bent.

An exemplary rugged furcation tube 1 has an inner jacket 5 surrounded by a radial array of fibers 10 and strength members 15 provided in a fiber and strength layer 17 which are surrounded by an outer jacket 20, for example as shown in FIGS. 1 and 2.

The fiber and strength layer 17 may be provided with a radial array of the strength members 13 spaced generally equal distances apart from one another, such that one of the strength members 13 is provided between each of the bundles of fiber 10.

The inner jacket 5 may be dimensioned for ease of inserting an optical fiber 30, fiber bundle and/or electrical conductor therethrough, with or without the assistance of a pull strand 25, for example, as shown in FIGS. 3 and 4. The pull strand 25 may be provided with suitable strength for pulling the desired conductors through the inner jacket 5, such as a para-aramid synthetic fiber or yarn.

The inner jacket 5 may be provided, for example, as a polymer material with desired strength, cost, temperature and/or moisture resistance characteristics, such as polyethylene, thermoplastic polyester elastomer, polytetrafluoroethylene, nylon, polyvinylidene difluoride and the like.

The inner jacket 5 may alternatively be provided further surrounding a fiber layer 35 and an inner tube 40, for example as shown in FIGS. 5 and 6.

Alternatively, the inner jacket 5 may surround a plurality of inner tubes 40, for example two inner tubes 40, as shown in FIGS. 9 and 10, or four inner tubes 40, as shown in FIGS. 7 and 8. The inner tubes 40 may be provided in a range of colors, for example for ease of fiber identification and termination with a 4 fiber-ODC connector or the like.

A pull strand 25 may also be provided in the inner diameter of each inner tube 40.

A fiber layer 35 may also be applied to fill space between and/or further stabilize the plurality of inner tubes 40 and the inner jacket 5, for example as shown in FIGS. 9-14.

The strength members 15 may be para-aramid, glass-reinforced plastic or other forms of resin-pultruded fiber rod selected for a desired tensile strength and cable bend radius. Alternatively, the strength members may be embedded in the outer jacket 20. One skilled in the art will appreciate that the strength members 15 also provide a thermal expansion stability characteristic to the furcation tube 1.

Diameters of the outer jacket 20 and/or inner jacket 5 may be selected to seat within connectors or seal glands at cable entry points of intended equipment and/or junction boxes.

One or more rip cords 45 may be provided between the outer and inner jackets 20, 5, for ease of stripping back the fiber and strength layer 17 during cable termination.

The fibers of the fiber and strength layer 17 and/or fiber layer 35 may be, for example, para-aramid fibers or yarn bundles.

One skilled in the art will appreciate that the rugged furcation tube 1 enables the splice-free fiber distribution of an optical cable, wherein the optical fibers are protected from kinking, crushing and/or thermal stresses. Further, color coding of inner tubes 40, pull strands 25 and/or rip cords 45 may simplify installation of the furcation tube 1.

Table of Parts

| | |
|---|---|
| 1 | furcation tube |
| 5 | inner jacket |
| 10 | fiber |
| 15 | strength member |
| 17 | fiber and strength layer |
| 20 | outer jacket |
| 25 | pull strand |
| 30 | optical fiber |
| 35 | fiber layer |
| 40 | inner tube |
| 45 | rip cord |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. A furcation tube for optical fibers, comprising:
   a hollow polymer inner jacket dimensioned for insertion of the optical fibers therewithin;
   the inner jacket surrounded by a fiber and strength layer, wherein the fiber and strength layer is provided with a plurality of strength members and a plurality of fiber bundles; one of the strength members provided between each of the fiber bundles; and
   a polymer outer jacket surrounding the fiber and strength layer.

2. The furcation tube of claim 1, wherein the inner jacket surrounds a plurality of inner tubes.

3. The furcation tube of claim 2, wherein the inner tubes are each a different color.

4. The furcation tube of claim 2, further including a fiber layer in a fill space between the inner tubes and the inner jacket.

5. The furcation tube of claim 1, further including a rip cord between the inner jacket and the outer jacket.

6. The furcation tube of claim 1, further including a pull string in the inner jacket.

7. The furcation tube of claim 2, further including a pull string in each of the inner tubes.

8. The furcation tube of claim 1, wherein the strength members are generally equidistant from one another.

9. The furcation tube of claim 1, wherein the fibers are para-aramid fibers.

10. The furcation tube of claim 1, further including a plurality of glass-reinforced plastic rods in the fiber and strength layer.

11. The furcation tube of claim 1, further including a plurality of resin pultruded fiber rods in the fiber and strength layer.

12. The furcation tube of claim 1, wherein the fiber and strength layer includes para-aramid fibers.

13. The furcation tube of claim 1, wherein the inner jacket and the outer jacket are aligned coaxially.

14. A method for manufacturing a furcation tube for optical fibers, comprising:
    providing a polymer inner jacket dimensioned for insertion of the optical fibers therewithin;
    surrounding the inner jacket with a fiber and strength layer, wherein the fiber and strength layer is provided with a plurality of strength members and a plurality of fiber bundles; one of the strength members provided between each of the fiber bundles; and
    surrounding the fiber and strength layer with a polymer jacket.

15. The method of claim 14, further including the step of surrounding a plurality of inner tubes with the inner jacket.

16. The method of claim 15, wherein the inner tubes are each a different color.

17. The method of claim 15, further including a fiber layer in a fill space between the inner tubes and the inner jacket.

18. The method of claim 14, further including the step of inserting a rip cord between the inner jacket and the outer jacket.

19. The method of claim 14, further including the step of placing a pull string in the inner jacket.

* * * * *

UNITED STATES PATENT AND TRADEMARK OFFICE
CERTIFICATE OF CORRECTION

| | | |
|---|---|---|
| PATENT NO. | : 9,536,640 B2 | Page 1 of 1 |
| APPLICATION NO. | : 13/832131 | |
| DATED | : January 3, 2017 | |
| INVENTOR(S) | : Nahid Islam | |

It is certified that error appears in the above-identified patent and that said Letters Patent is hereby corrected as shown below:

On the Title Page

Page 2, Item (56), Column 2, References Cited, U.S. PATENT DOCUMENTS:

Please correct "2011/0243514  A1*  10/2011 Nav..........G02B 6/4459 385/110"

To read -- 2011/0243514  A1*  10/2011 Nave'..........G02B 6/4459 385/110 --

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*